(12) United States Patent
Stone et al.

(10) Patent No.: US 7,600,487 B2
(45) Date of Patent: Oct. 13, 2009

(54) LIQUID BIRD FEEDER

(75) Inventors: John Stone, Southboro, MA (US);
Oliver McLachlan, Boston, MA (US);
David Harting, Needham, MA (US)

(73) Assignee: Woodstream Corporation, Lititz, PA (US)

( * ) Notice: Subject to any disclaimer, the term of this patent is extended or adjusted under 35 U.S.C. 154(b) by 26 days.

(21) Appl. No.: 11/434,020

(22) Filed: May 15, 2006

(65) Prior Publication Data

US 2007/0272161 A1    Nov. 29, 2007

Related U.S. Application Data

(60) Provisional application No. 60/681,376, filed on May 16, 2005.

(51) Int. Cl.
*A01K 7/00* (2006.01)
*A01K 7/06* (2006.01)

(52) U.S. Cl. .......................... 119/72; 119/77
(58) Field of Classification Search .................. 119/72, 119/74, 51.01, 57.9, 52.2, 57.8, 77
See application file for complete search history.

(56) References Cited

U.S. PATENT DOCUMENTS

| | | | | |
|---|---|---|---|---|
| 516,600 | A * | 3/1894 | Higgins | 119/77 |
| 516,637 | A * | 3/1894 | Higgins | 119/77 |
| 645,680 | A * | 3/1900 | Chapman | 119/77 |
| 1,627,140 | A * | 5/1927 | Bindemann | 119/77 |
| 1,828,048 | A * | 10/1931 | Jevons | 119/77 |
| 2,687,115 | A * | 8/1954 | Andrews | 119/77 |
| 3,780,703 | A * | 12/1973 | Boehland, Jr. | 119/53 |
| 4,977,859 | A * | 12/1990 | Kilham | 119/52.2 |
| 5,062,388 | A * | 11/1991 | Kilham | 119/52.2 |
| 5,123,574 | A * | 6/1992 | Poulos | 222/362 |
| 5,247,904 | A * | 9/1993 | Anderson | 119/72 |
| 5,303,674 | A * | 4/1994 | Hyde, Jr. | 119/77 |
| 5,423,291 | A * | 6/1995 | Daugherty | 119/77 |
| 5,454,348 | A * | 10/1995 | Colwell et al. | 119/72 |
| 5,507,249 | A * | 4/1996 | Shaw | 119/72 |
| 5,924,382 | A * | 7/1999 | Shumaker | 119/72 |
| 6,257,288 | B1 * | 7/2001 | Davidian et al. | 141/324 |
| 6,543,384 | B2 * | 4/2003 | Cote | 119/57.9 |
| 6,739,284 | B1 * | 5/2004 | Olive | 119/74 |
| 7,000,566 | B2 * | 2/2006 | Fort, II | 119/69.5 |
| 7,040,251 | B2 * | 5/2006 | Fort, II | 119/57.8 |
| 7,146,930 | B1 * | 12/2006 | Ness | 119/77 |
| 7,201,115 | B2 * | 4/2007 | Willinger et al. | 119/464 |
| 7,234,418 | B2 * | 6/2007 | Fort et al. | 119/72 |
| 2005/0028743 | A1 * | 2/2005 | Wechsler | 119/52.1 |

* cited by examiner

*Primary Examiner*—Michael R Mansen
*Assistant Examiner*—Brian M O'Hara
(74) *Attorney, Agent, or Firm*—Jacobson Holman PLLC

(57) ABSTRACT

A liquid bird feeder provides a liquid container having a sealable top opening and a bottom opening, a liquid tray adapted to immerse the bottom opening in liquid, and a valve mechanism adapted to close the bottom opening to enable the liquid container to be filled through the sealable top opening.

23 Claims, 4 Drawing Sheets

LIQUID BIRD FEEDER

CROSS REFERENCE TO RELATED APPLICATIONS

This application claims priority of Provisional Application No. 60/681,376, entitled "LIQUID BIRD FEEDER" filed on May 16, 2005, and which is incorporated herein by reference.

FIELD OF THE INVENTION

The present invention generally relates to liquid bird feeders and in particularly to such bird feeders which may be filled without inversion.

BACKGROUND OF THE INVENTION

Liquid nectar bird feeders are used for specifically attracting humming birds in the same manner as seed feeders are used to attract other birds. Some may consider liquid nectar feeders to be less convenient however, because of the liquid auto-feed structure. Filling liquid feeders commonly requires inversion of the feeder and certain liquid spillage from this action.

It is therefore desirable to have a liquid nectar feeder which minimizes liquid spillage during filling and which even avoids inversion during filling.

SUMMARY OF THE INVENTION

In one embodiment of the present invention, a liquid bird feeder, comprises a liquid container having a sealable top opening and a bottom opening, a liquid tray adapted to immerse the bottom opening in liquid, and a valve mechanism adapted to close the bottom opening to enable the liquid container to be filled through the sealable top opening.

The liquid container may include a vertically oriented cylindrical extension forming the bottom opening. The liquid tray may include a vertically oriented cylindrical collar adapted to connect to the cylindrical extension of the liquid container. The cylindrical collar may include a cylindrical side wall having a liquid port located therein. The valve mechanism may include a rotatable cylindrical member having an opening adapted to selectively align and misalign with the port in the cylindrical collar to respectively open or close the port with rotation of the rotatable cylindrical member. The cylindrical collar may include a plurality of ports and the rotatable cylindrical member may include a corresponding plurality of openings adapted to simultaneously align or misalign with the plurality of ports for respectively opening and closing all of the plurality of ports simultaneously with rotation of the rotatable cylindrical member.

The rotatable cylindrical member may be adapted to be at least partially immersed in liquid within the liquid tray and may include an actuator which extends above the port in the cylindrical collar, and thus above a normal liquid level in the liquid tray. The liquid tray may include a tray cover having one or more feeding ports passing there through and a slot adapted to allow the actuator to be operable from outside of the tray cover to rotate the rotatable cylindrical member The liquid container may include a top cover adapted to seal the top opening.

BRIEF DESCRIPTION OF THE DRAWINGS

The present invention is illustratively shown and described in reference to the accompanying drawings, in which.

DETAILED DESCRIPTION OF THE DRAWINGS

Figure 1:
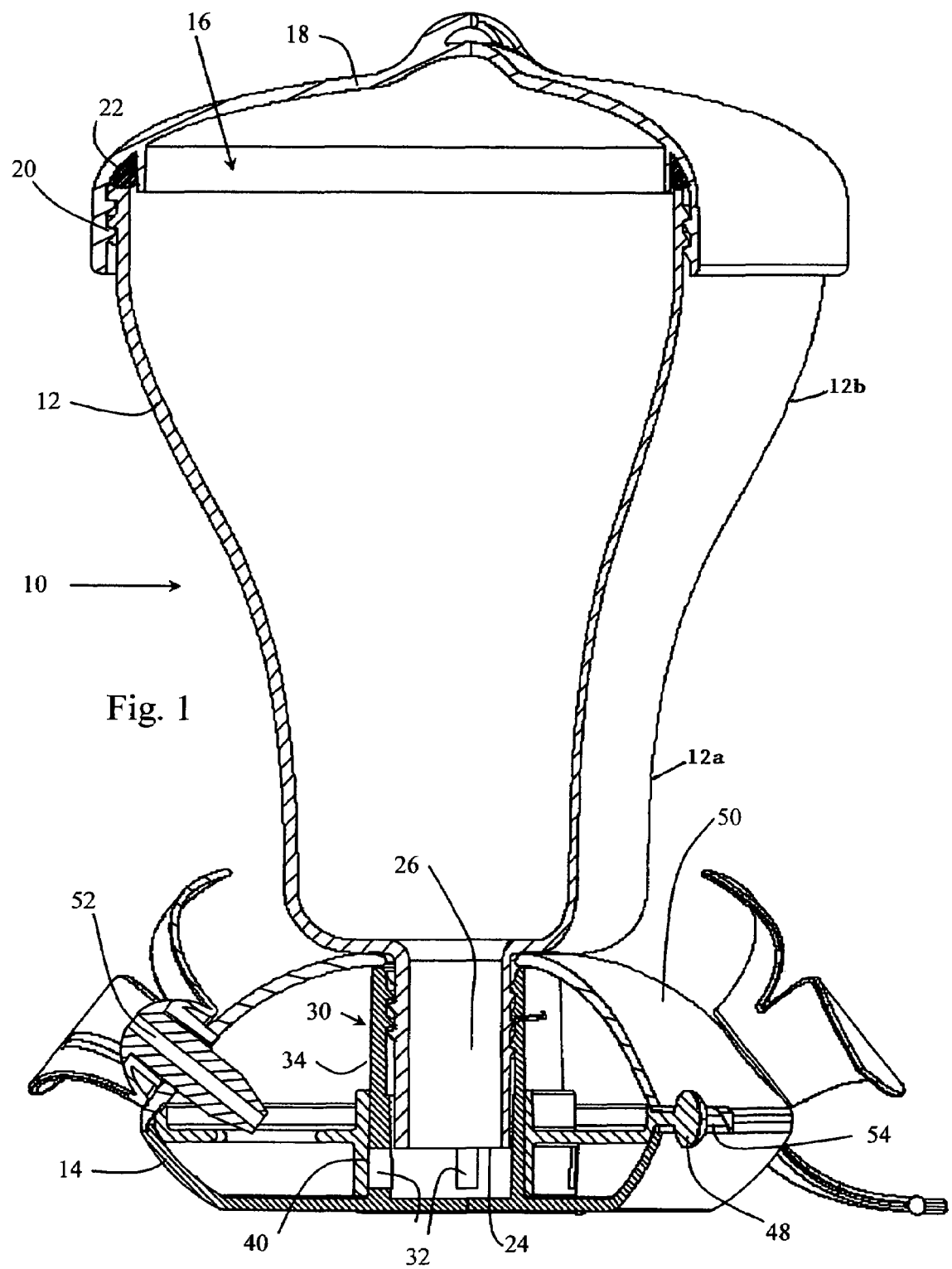
FIG. 1 is a sectional side view of a bird feeder constructed in accordance with one embodiment of the present invention.

FIG. 1 generally shows a sectional side view of a bird feeder 10, which generally includes a reservoir or liquid container 12 and a liquid tray 14. Liquid container 12 includes a sealable top opening 16 having a cover 18 adapted to seal top opening 16. Cover 18 includes peripheral threads 20 adapted to engage liquid container 12 and an O-ring seal 22 located to create an air tight seal.

Figure 2:
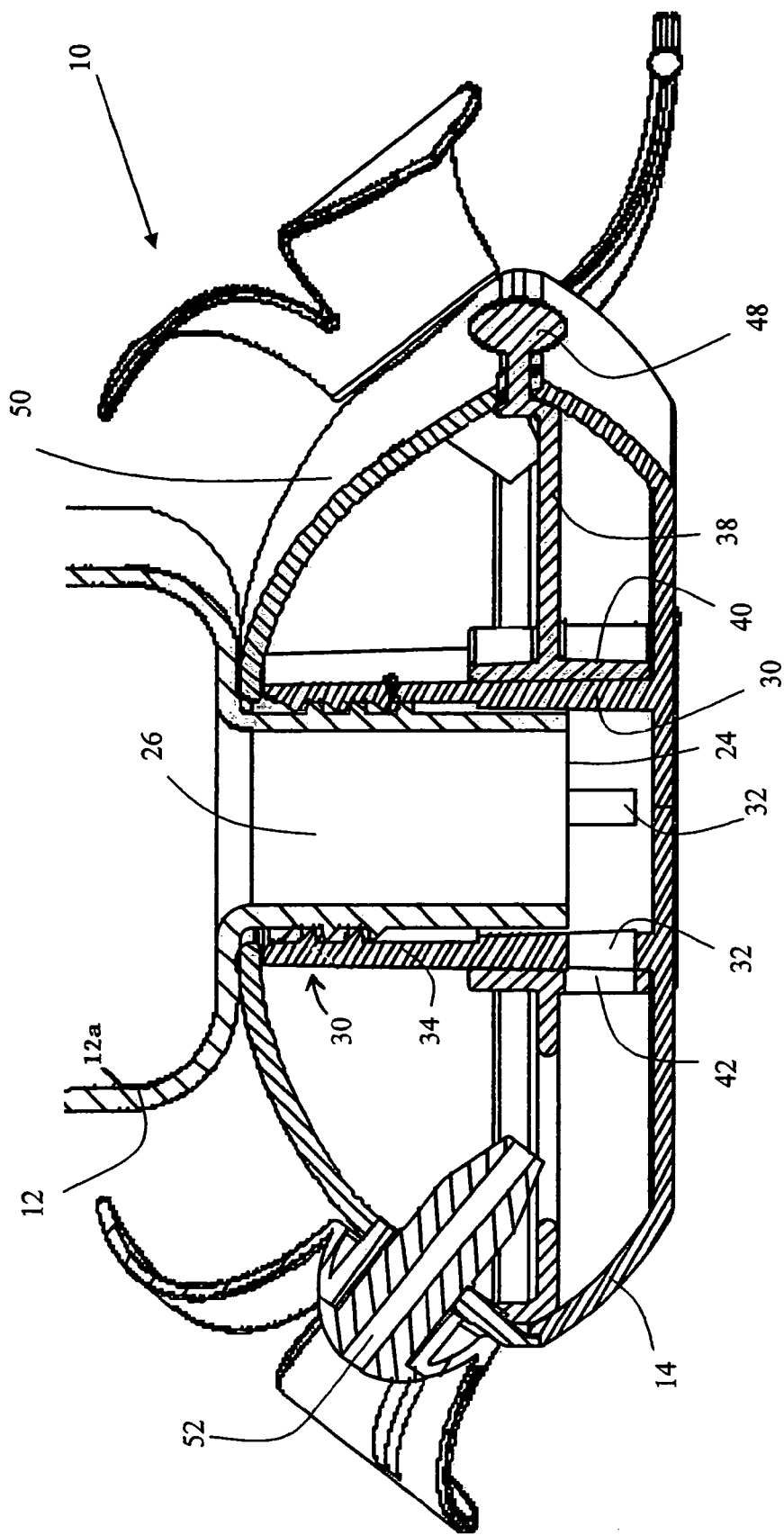
FIG. 2 is an enlarged, partial sectional, side view of the embodiment of FIG. 1, showing greater detail and having a component is located in a different operative position from the view of FIG. 1.

FIG. 2 shows an enlarged sectional side view of the lower portion of bird feeder 10. Liquid container 12 also includes a bottom opening 24 formed by a cylindrical extension 26 of the lower end 12a of liquid container 12. Bottom opening 24 and liquid tray 14 are oriented to immerse bottom opening 24 in liquid from liquid container 12. This arrangement allows a vacuum created in the upper end 12b of liquid container 12 to retain liquid therein and automatically feed liquid into liquid tray 14 to the level of bottom opening 24.

Liquid tray 14 includes a vertically oriented, cylindrical collar generally designated by reference numeral 30, which extends upwardly and is adapted to engage cylindrical extension 26 of liquid container 12. Cylindrical collar 30 is axially closed at its lower end by formation with liquid tray 14, but includes one or more ports 32 formed in the cylindrical side wall 34.

Bird feeder 10 further includes a valve mechanism 38 including a rotatable cylindrical member 40. Cylindrical member 40 includes a one or more openings 42 adapted to either align with a port 32 or misalignment in response to the rotation of valve mechanism 38 and rotatable cylindrical member 40. FIG. 2 shows opening 42 in alignment with a port 32, while FIG. 1 shows a port 32 covered by a portion of rotatable cylindrical member 40, thus effecting closure of ports 32.

Figure 3:
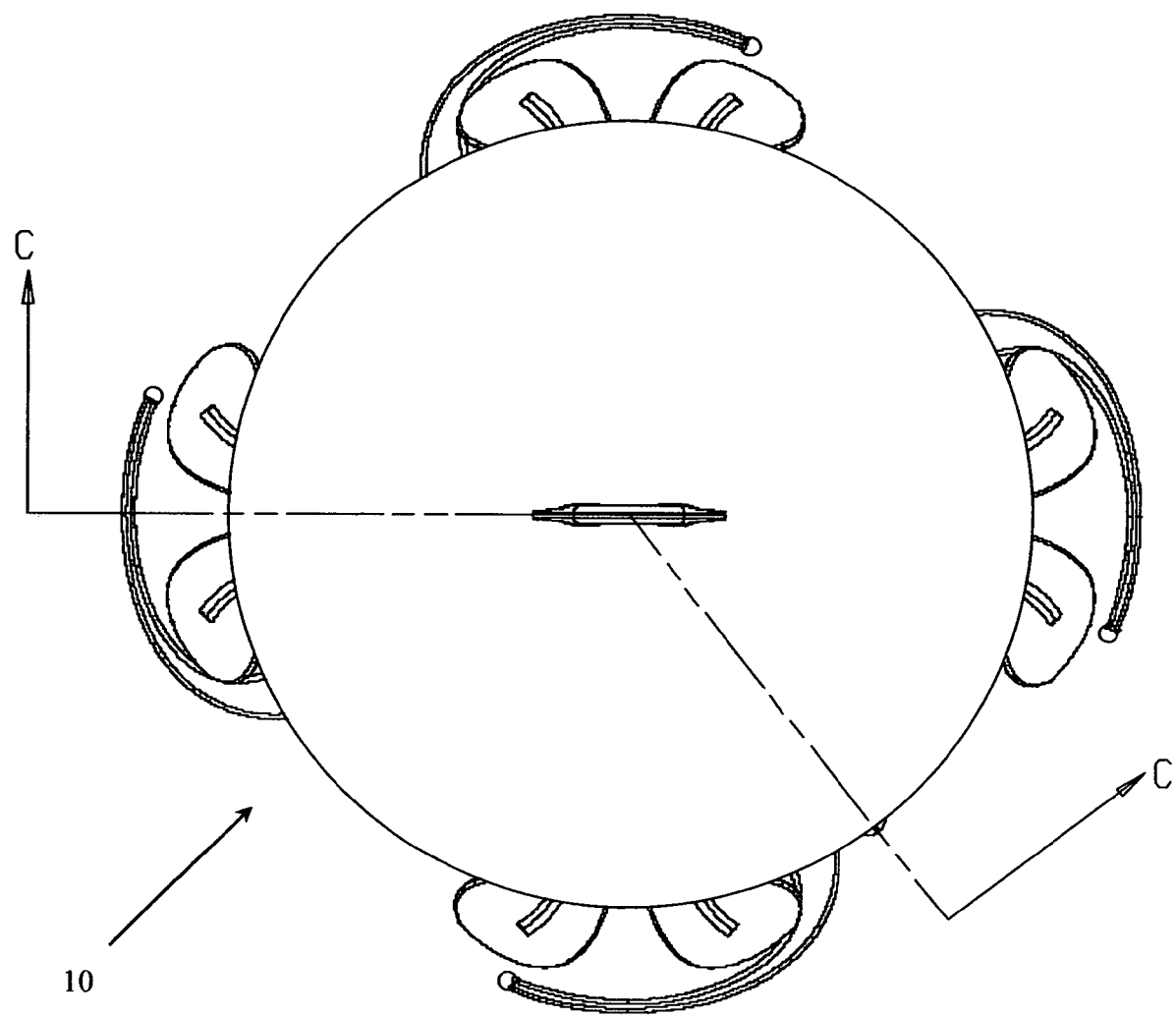
FIG. 3 is a top view of the bird feeder of FIGS. 1 and 2 showing approximate cross sectional cut lines used for FIGS. 1 and 2.

FIG. 3 shows the approximate cross section used for FIGS. 1 and 2. However, the angled leg of the cross section line C-C is slightly different between FIGS. 1 and 2, because the cross section passes though actuator handle 48, which is in different positions in FIGS. 1 and 2.

Figure 4:
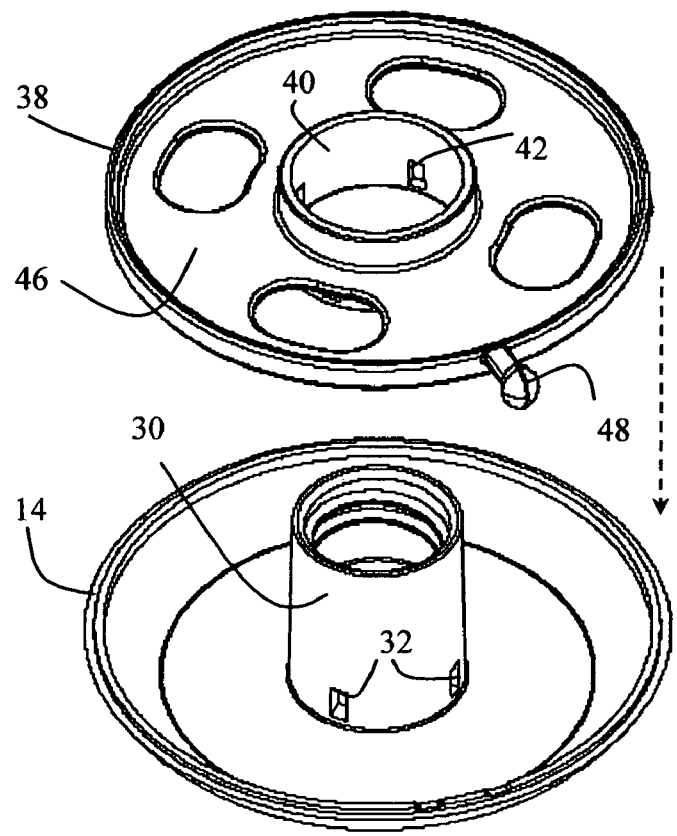
FIG. 4 is a perspective view of two components used in the bird feeder of FIGS. 1-3.
Figure 5:
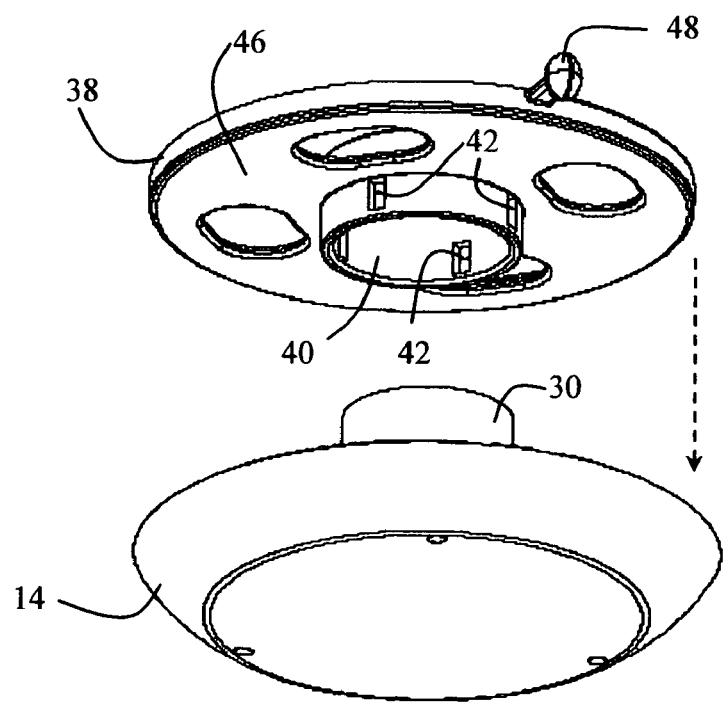
FIG. 5 is a different perspective view of the bird feeder components of FIG. 4.

FIGS. 4 and 5 show respective upper and lower perspective views of the liquid tray 14 and valve mechanism 38. FIG. 4 shows cylindrical collar 30 to have a plurality of ports 32, and FIG. 5 shows rotatable cylindrical member 40 to have a plurality of openings 42. Ports 32 and openings 42 are located at the same angular positions around the their respective cylindrical axes to cause simultaneous misalignment or alignment between all ports 32 and openings 42, thus allowing bottom opening 24 to be selectively closed or opened. Valve mechanism 38 further includes a circular disk 46 and an actuator handle 48, which are shown to extend above the level of port 32 in FIGS. 1 and 2. This enables activation of valve mechanism 38 even while there is liquid present in liquid tray 14.

Now returning to FIGS. 1 and 2, liquid tray 14 further includes a cover 50 adapted to substantially close liquid tray 14 and limit access to any liquid contents thereof. Cover 50 includes a plurality of bird feeder ports 52 adapted to allow access by long-beaked humming birds while simultaneously preventing access by bees. Cover 50 further includes a slot 54 to allow the actuator handle 48 to extend outside of liquid tray 14.

The unique construction of bird feeder 10 thus allows filling thereof without necessitating undesired dripping or spillage of liquid nectar.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed it is:

1. A top-fill liquid bird feeder for providing liquid nectar to hummingbirds, comprising:
    a liquid container configured to contain a volume of liquid nectar and having a sealable top opening and a bottom portion with a bottom opening;
    a cover adapted to engage said liquid container to close said top opening and create an airtight seal therewith;
    a liquid tray adapted to immerse said bottom opening in liquid to allow a vacuum created in an upper end of said liquid container to retain liquid in said container when the top opening is sealed by the cover, said tray including a vertically oriented cylindrical collar adapted to connect to said bottom portion of said liquid container, said cylindrical collar being axially closed at a lower end thereof by said liquid tray and having a vertically oriented cylindrical side wall with at least one liquid port located therein, said liquid tray including at least one feeding port through which hummingbirds can access the liquid nectar in said tray; and
    a valve mechanism adapted to close said bottom opening to enable said liquid container to be filled by removing said cover and adding liquid nectar through said top opening while, at the same time, blocking leakage of any remaining nectar still in said liquid container through said feeding port by said valve mechanism closure of said bottom opening, said valve mechanism including a rotatable member having a vertically oriented cylindrical side wall with at least one opening therein adapted to be selectively aligned and misaligned with said at least one liquid port in said cylindrical collar to respectively open and close said port upon rotation of said rotatable member around a vertical axis.

2. The top-fill liquid bird feeder of claim 1, wherein said bottom portion of said liquid container includes a vertically oriented cylindrical extension forming said bottom opening that is received within said cylindrical collar.

3. The top-fill liquid bird feeder of claim 2, wherein said liquid tray includes a tray cover adapted to substantially close said liquid tray, said feeding port passing through said cover with a narrow elongated passageway that is sized to allow access by long-beaked hummingbirds while preventing access by bees, liquid in said liquid tray being accessible to hummingbirds only through said feeding port when said feeder is in use.

4. The top-fill liquid bird feeder of claim 1, wherein said cylindrical collar includes a plurality of ports and said rotatable member includes a corresponding plurality of openings in said cylindrical side wall that are adapted to simultaneously align and misalign with said plurality of ports for respectively opening and closing all of said plurality of ports simultaneously with rotation of said rotatable member around said vertical axis.

5. The top-fill liquid bird feeder of claim 1, wherein said rotatable member is adapted to be at least partially immersed in liquid within said liquid tray and includes an actuator which extends above said port in said cylindrical collar and thus above a normal liquid level in said liquid tray.

6. The top-fill liquid bird feeder of claim 5, wherein said liquid tray includes a tray cover through which said feeding port passes, said tray cover having a slot adapted to allow said actuator to be operable from outside of said tray cover to rotate said rotatable member.

7. A top-fill liquid hummingbird feeder, comprising:
    a liquid container for receiving hummingbird nectar through a sealable top opening and dispensing said nectar through a bottom opening;
    a container cover adapted to engage said liquid container to close said top opening and create an airtight seal therewith;
    a liquid tray defining a nectar enclosure adapted to immerse said bottom opening in nectar in said nectar enclosure and thereby allow a vacuum created in said liquid container to retain liquid in said container when the top opening is sealed by the cover, said container extending above said liquid tray;
    said liquid tray including a cover having at least one feeding port passing therethrough with a narrow elongated passageway extending into said nectar enclosure that is sized to allow access by hummingbirds while preventing access by bees, nectar in said liquid tray being accessible to hummingbirds outside said enclosure only through said feeding port and said narrow elongated passageway when said feeder is in use; and
    a valve mechanism adapted to open and close said container bottom opening to enable nectar to flow into said nectar enclosure from said liquid container through said bottom opening when said valve mechanism opens said bottom opening and to enable said liquid container to be filled with nectar by removing said cover and adding liquid nectar through said sealable top opening while, at the same time, retaining nectar still remaining in said liquid container in said liquid container when said valve mechanism closes said bottom opening.

8. The hummingbird feeder of claim 7, wherein said tray includes a vertically oriented collar with a port therein adapted to control closure of said container bottom opening, said valve mechanism including a cylindrical rotatable member with an opening therein adapted to be selectively aligned and misaligned with said liquid port in said cylindrical collar to respectively open and close said liquid port upon rotation of said rotatable member around a vertical axis.

9. The hummingbird feeder of claim 8, wherein said cylindrical collar includes a plurality of liquid ports and said cylindrical rotatable member includes a corresponding plurality of openings that are adapted to simultaneously align and misalign with said plurality of liquid ports for respectively opening and closing all of said plurality of liquid ports simultaneously upon rotation of said cylindrical rotatable member around said vertical axis.

10. The hummingbird feeder of claim 8, further comprising an elongated actuating member coupled to said cylindrical rotatable member and extending outwardly therefrom to facilitate rotation of said rotatable member by a user, said actuating member also rotating around said vertical axis.

11. The hummingbird feeder of claim 10, wherein said cylindrical rotatable member is adapted to be at least partially immersed in liquid within said liquid tray, said actuating member extending above said liquid port in said cylindrical collar and thus above a normal liquid level in said liquid tray.

12. The hummingbird feeder of claim 10, wherein said tray cover has a slot therein adapted to allow said actuating member to be operable from outside of said tray cover to rotate said cylindrical rotatable member.

13. The hummingbird feeder of claim 7, wherein said valve mechanism includes a rotatable member configured to open and close said bottom opening through rotation thereof, at least a part of said rotatable member being contained within said liquid tray and covered by said liquid tray cover.

14. The hummingbird feeder of claim 13, wherein said part of said rotatable member contained within said liquid tray and covered by said liquid tray cover is adapted to be at least partially immersed in the nectar in said nectar enclosure.

15. The hummingbird feeder of claim 13, wherein said rotatable member includes an actuator which extends outside said liquid tray and liquid tray cover, said actuator being coupled to said rotatable member part that is contained within said liquid tray and covered by said liquid tray cover.

16. The hummingbird feeder of claim 15, wherein said tray cover has a slot therein through which said actuator extends so as to be operable from outside of said tray cover to rotate said rotatable member.

17. The hummingbird feeder of claim 13, wherein said rotatable member rotates around a vertical axis corresponding with a vertical axis of said container.

18. The hummingbird feeder of claim 7, wherein closure of said bottom opening by said valve mechanism retains nectar remaining in said liquid container from flowing into said nectar enclosure and thereafter leaking through the feeding port when the vacuum in the liquid container is destroyed by removal of said container cover for filling of the feeder.

19. A top-fill liquid hummingbird feeder, comprising:
   a liquid container for receiving hummingbird nectar through a sealable top opening and dispensing said nectar through a bottom opening in a bottom portion of said container;
   a cover with a sealing element adapted to engage said liquid container to close said top opening and create an airtight seal therewith;
   a covered liquid tray defining an enclosure accessible by at least one feeding port and adapted to immerse said bottom opening in said nectar and thereby allow a vacuum created in said liquid container to retain liquid in said container when the top opening is sealed by the cover, said tray including a vertically oriented cylindrical collar positioned in said tray enclosure for connection to said bottom portion of said liquid container, said cylindrical collar having a liquid port located therein; and
   a valve mechanism configured to cooperate with said cylindrical collar to open and close said collar liquid port by manipulating an element outside of said enclosure, closure of said collar liquid port enabling said liquid container to be filled with nectar through said sealable top opening when said cover is removed while retaining any remaining nectar still in said liquid container.

20. The hummingbird feeder of claim 19, wherein said valve mechanism includes a cylindrical rotatable member with an opening therein adapted to be selectively aligned and misaligned with said liquid port in said cylindrical collar to respectively open and close said port upon rotation of said rotatable member around a vertical axis.

21. The hummingbird feeder of claim 20, wherein said cylindrical collar includes a plurality of liquid ports and said cylindrical rotatable member includes a corresponding plurality of openings that are adapted to simultaneously align and misalign with said plurality of liquid ports for respectively opening and closing all of said plurality of liquid ports simultaneously with rotation of said rotatable cylindrical member around said vertical axis.

22. The hummingbird feeder of claim 20, wherein said element includes an elongated actuating member coupled to said cylindrical rotatable member and extending outwardly therefrom to facilitate rotation of said rotatable member by a user, said actuating member also rotating around said vertical axis.

23. The hummingbird feeder of claim 22, wherein said cylindrical rotatable member is adapted to be at least partially immersed in liquid within said liquid tray enclosure, said actuating member extending above said port in said cylindrical collar and thus above a normal liquid level in said liquid tray.

* * * * *